(12) United States Patent
Hirakawa et al.

(10) Patent No.: US 9,244,944 B2
(45) Date of Patent: Jan. 26, 2016

(54) METHOD, ELECTRONIC DEVICE, AND COMPUTER PROGRAM PRODUCT

(71) Applicant: KABUSHIKI KAISHA TOSHIBA, Minato-ku, Tokyo (JP)

(72) Inventors: Daisuke Hirakawa, Saitama (JP); Kohji Saiki, Kawasaki (JP); Yuuji Irimoto, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 46 days.

(21) Appl. No.: 14/185,031

(22) Filed: Feb. 20, 2014

(65) Prior Publication Data

US 2015/0055891 A1  Feb. 26, 2015

(30) Foreign Application Priority Data

Aug. 23, 2013  (JP) .................................. 2013-173393

(51) Int. Cl.
*G06K 9/54* (2006.01)
*G06F 17/30* (2006.01)

(52) U.S. Cl.
CPC ................................ *G06F 17/30247* (2013.01)

(58) Field of Classification Search
CPC .......... G06K 9/00221; G06K 9/00624; G06K 9/00677; G06K 9/4647; G06K 9/6201; G06K 9/6212; G06K 9/6218; G06K 9/6221; G06K 9/6267; G06K 9/64; G06K 2209/00328; G06K 2209/27; H04N 1/00307; H04N 21/2665; H04N 21/812; G06F 17/30; G06F 17/3002; G06F 17/30038; G06F 17/30067; G06F 17/30091; G06F 17/30126; G06F 17/30247; G06F 17/30256; G06F 17/30265; G06F 17/3026; G06F 17/30268; G06F 17/30277; Y10S 707/915; Y10S 707/99933; Y10S 707/99945

See application file for complete search history.

(56) References Cited

U.S. PATENT DOCUMENTS

| | | | |
|---|---|---|---|
| 6,353,823 B1 * | 3/2002 | Kumar ................................. | 1/1 |
| 6,480,840 B2 * | 11/2002 | Zhu et al. ............................. | 1/1 |
| 8,024,343 B2 * | 9/2011 | Gallagher ..................... | 707/737 |
| 8,086,600 B2 * | 12/2011 | Bailey et al. .................. | 707/723 |
| 2007/0244925 A1 | 10/2007 | Albouze | |
| 2008/0208791 A1 | 8/2008 | Das et al. | |

(Continued)

FOREIGN PATENT DOCUMENTS

| | | |
|---|---|---|
| GB | 2 495 978 A | 5/2013 |
| JP | 2001-045257 A | 2/2001 |
| JP | 4017790 B2 | 9/2007 |

(Continued)

OTHER PUBLICATIONS

The extended European search report issued by the European Patent Office on May 22, 2014 in the corresponding European patent application No. 14156055.7—7 pages.

*Primary Examiner* — Jose Couso

(74) *Attorney, Agent, or Firm* — Knobbe, Martens Olson & Bear LLP

(57) ABSTRACT

According to one embodiment, a method has storing, registering and displaying. The storing is storing a plurality of images having at least a first image in storage. The registering is registering first information related to the first image. The displaying is displaying, when the first image corresponds to a second image acquired by a camera, the first information or information related to the first information on a display.

15 Claims, 6 Drawing Sheets

(56) References Cited

U.S. PATENT DOCUMENTS

| | | | |
|---|---|---|---|
| 2010/0158315 A1* | 6/2010 | Martin | 382/103 |
| 2011/0211737 A1* | 9/2011 | Krupka et al. | 382/118 |
| 2012/0213404 A1 | 8/2012 | Steiner | |
| 2015/0049900 A1* | 2/2015 | Kamitani et al. | 382/100 |

FOREIGN PATENT DOCUMENTS

| | | |
|---|---|---|
| JP | 4069841 B2 | 1/2008 |
| JP | 2012-155362 A | 8/2012 |
| WO | WO 2007/005118 A2 | 1/2007 |

\* cited by examiner

METHOD, ELECTRONIC DEVICE, AND COMPUTER PROGRAM PRODUCT

CROSS-REFERENCE TO RELATED APPLICATIONS

This application is based upon and claims the benefit of priority from Japanese Patent Application No. 2013-173393, filed Aug. 23, 2013, the entire contents of which are incorporated herein by reference.

FIELD

An embodiment described herein relates generally to a method, an electronic device, and a computer program product.

BACKGROUND

Conventionally, there has been known a technology in which, when a user sends an image to a server where web-based image search is available, the user can acquire relevant information from the server. Here, the relevant information is information relevant to images that are the same as or similar to the image that the user has sent.

The conventional technology described above uses a web-based image search technology. This technology does not change a range of databases to be searched depending on a user who requests the relevant information. Thus, it is difficult, for example, for a user to extract relevant information by referring to only a group that contains images captured (registered) by the user with the conventional technology.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a method comprises storing, registering and displaying. The storing is storing a plurality of images comprising at least a first image in storage. The registering is registering first information related to the first image. The displaying is displaying, when the first image corresponds to a second image acquired by a camera, the first information or information related to the first information on a display.

An embodiment will now be described with reference to the accompanying drawings.

First described is an exemplary structure of an electronic device according to an embodiment with reference to FIGS. 1 to 4. This electronic device can be implemented as a built-in system installed in various electronic devices such as a tablet computer, a notebook computer, a smart phone, a personal digital assistant (PDA), and a digital camera. In the following description, the electronic device is implemented as a tablet computer 10. The tablet computer 10 is a portable electronic device (information processing device) and is called a tablet or a smart computer.

Figure 1:
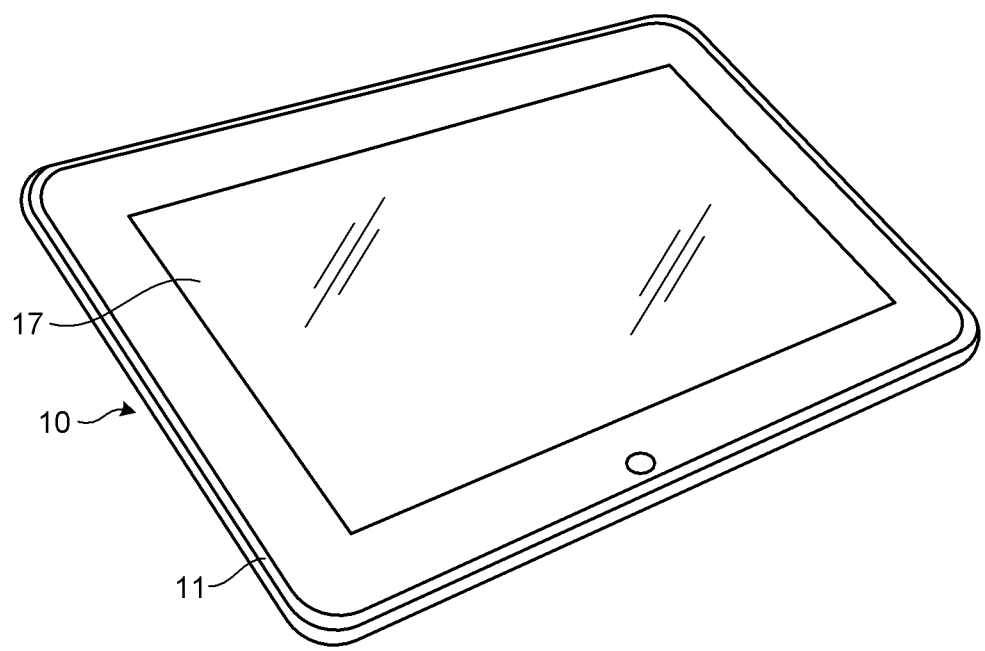
FIG. 1 is an exemplary diagram illustrating an appearance of a tablet computer (electronic device) according to an embodiment.

As illustrated in FIG. 1, the tablet computer 10 comprises a main body 11 and a display module 17. The main body 11 comprises a housing having a thin-box shape. The display module 17 comprises a flat panel display and sensors that are configured to detect a touch position of a pen or a finger on a screen of the flat panel display.

The flat panel described above display includes a liquid crystal display (LCD) 17A (see FIG. 2), for example. The sensors described above include a capacitive touch panel 17B (see FIG. 2), for example. The sensors described above can include an electromagnetic digitizer, for example. Although not illustrated in FIG. 1, a camera module 109 (see FIG. 2) that acquires an image (picture) is provided on the back of the main body 11.

Figure 2:
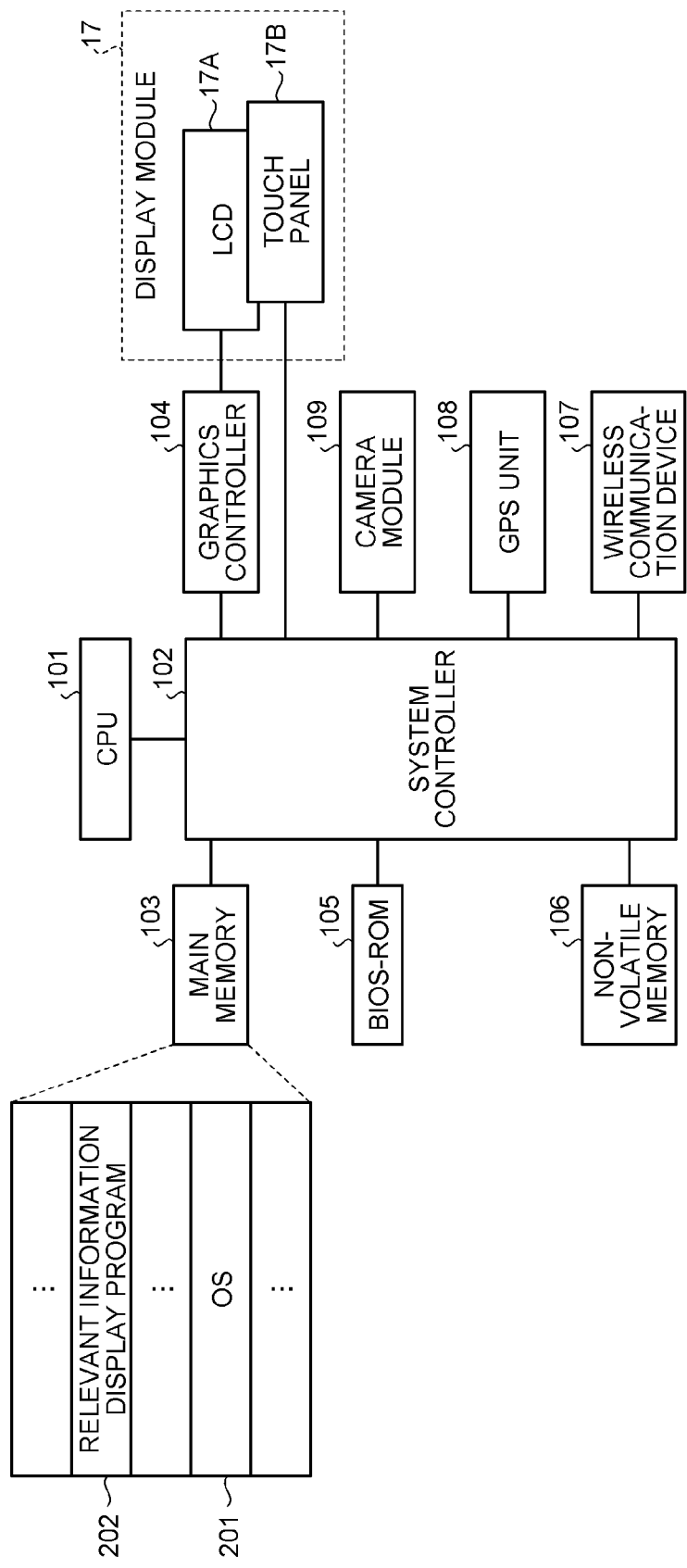
FIG. 2 is an exemplary block diagram illustrating an internal configuration of the tablet computer illustrated in FIG. 1, in the embodiment.

As illustrated in FIG. 2, the tablet computer 10 mainly comprises a CPU 101, the display module 17, a system controller 102, a main memory 103, a graphics controller 104, a BIOS-ROM 105, a non-volatile memory 106, a wireless communication device 107, a global positioning system (GPS) unit 108, and the camera module 109. The CPU 101 is an example of a "storage controller" and a "display controller". The non-volatile memory 106 is an example of "storage".

The display module 17 comprises the LCD 17A and the touch panel 17B. The LCD 17A displays video such as a static image and a moving image. The touch panel 17B functions as an operating module for various operations (touch operations) on the tablet computer 10.

The CPU 101 is configured to control various modules in the tablet computer 10. The CPU 101 is configured to execute various types of software to be loaded on the main memory 103 from the non-volatile memory 106 as a storage device. The software comprises an operation system (OS) 201, various application programs and the like. According to the embodiment, the application programs include a relevant information display program 202 described later.

The CPU 101 is configured to also execute a basic input/output system program (BIOS program) stored in the BIOS-ROM 105. The BIOS program is a computer program to control hardware.

The system controller 102 is a device that connects a local bus of the CPU 101 and various components. The system controller 102 comprises a memory controller or the like. The memory controller controls access to the main memory 103. The system controller 102 has a function to communicate with the graphics controller 104 via a serial bus or the like that conforms to standards such as peripheral component interconnect (PCI) EXPRESS (registered trademark).

The graphics controller 104 is a display controller that controls the LCD 17A used as a display monitor of the tablet computer 10. The LCD 17A is configured to display a screen image (video such as a static image and a moving image) on the basis of a display signal input from the graphics controller 104.

The wireless communication device 107 is a device to perform wireless communication such as a wireless local area network (LAN), a third generation (3G) mobile communication or the like. The GPS unit 108 is a device to determine a present position by using an artificial satellite. The camera module 109 is a device to capture an image (picture).

In the embodiment, the non-volatile memory 106 is configured to be able to register (store therein) an image (first image) and relevant information relevant to the first image in association with each other. The first image may be an image captured by the camera module 109, or an image downloaded via a network.

The relevant information includes, for example, a feature of the first image. Specifically, the relevant information is information such as the time and date when the first image was acquired, the place where the first image was acquired, and the subject (person) appearing in the first image. Such relevant information may be registered in the non-volatile memory 106 on the basis of a manual input operation by a user, or on the basis of automatic control of the CPU 101. In the embodiment, for example, the CPU 101 is configured to automatically register relevant information relevant to at least one image of a plurality of images stored in the non-volatile memory 106. In other words, the CPU 101 is configured to, when the camera module 109 acquires a first image, automatically extract relevant information on the first image (a feature of the first image or the like), and register in the non-volatile memory 106 the extracted relevant information and the first image in association with each other. According to this configuration, the user does not need to input relevant information manually, thereby operation load of the user can be reduced. The method of extracting a feature of an image is described later.

The relevant information is not limited to a feature of the first image, but the relevant information may include any information as long as it is relevant to the first image. For example, when the user uploads a first image to a web page such as a weblog, address information (such as a URL) of the web page may be registered in the non-volatile memory 106 as relevant information corresponding to the first image. For example, when the user accesses a web server to update a weblog (web page) which includes the first image, the wireless communication device 107 of the tablet computer 10 may transmit the first image to the web server and then register, in the non-volatile memory 106, the first image and the address information of the weblog in association with each other.

The relevant information may also include a web page that contains a detailed description of a place where the first image was acquired. In the embodiment, data stored in an external device other than the tablet computer 10 can be associated with the first image as the relevant information.

The relevant information is not limited to text data such as a feature of a first image and address information on a web page to which the first image is uploaded, but may include binary data such as music data. For example, music that the user listened to at a place where the first image was captured may be registered in the non-volatile memory 106 as relevant information corresponding to the first image.

In the embodiment, when a user acquires many images in everyday life, the user can associate these images with various types of relevant information. This allows the user to record and manage his or her life, activities, and experiences collectively by using the tablet computer 10. Thereby, what is called a life log service using images can be implemented.

In the embodiment, the CPU 101 is configured to control, when a first image of a plurality of images stored in the non-volatile memory 106 and a second image acquired by the camera module 109 correspond to each other, the display module 17 to display relevant information relevant to the first image (first relevant information) or information that can be acquired by the first relevant information. Specifically, when a user points the camera module 109 at a subject and the camera module 109 acquires an image of the subject, the CPU 101 extracts relevant information relevant to an image (first image) that is the same as or similar to the image (second image) of the subject from the non-volatile memory 106, and controls the display module 17 to display the extracted relevant information. The first image same as or similar to the second image includes a first image having a feature that matches a feature in a second image at a matching rate equal to or larger than a predetermined value, a first image acquired on the same time and date as the second image, a first image acquired at the same place as the second image, a first image containing the same subject (person) as the second image or the like.

Figure 4:
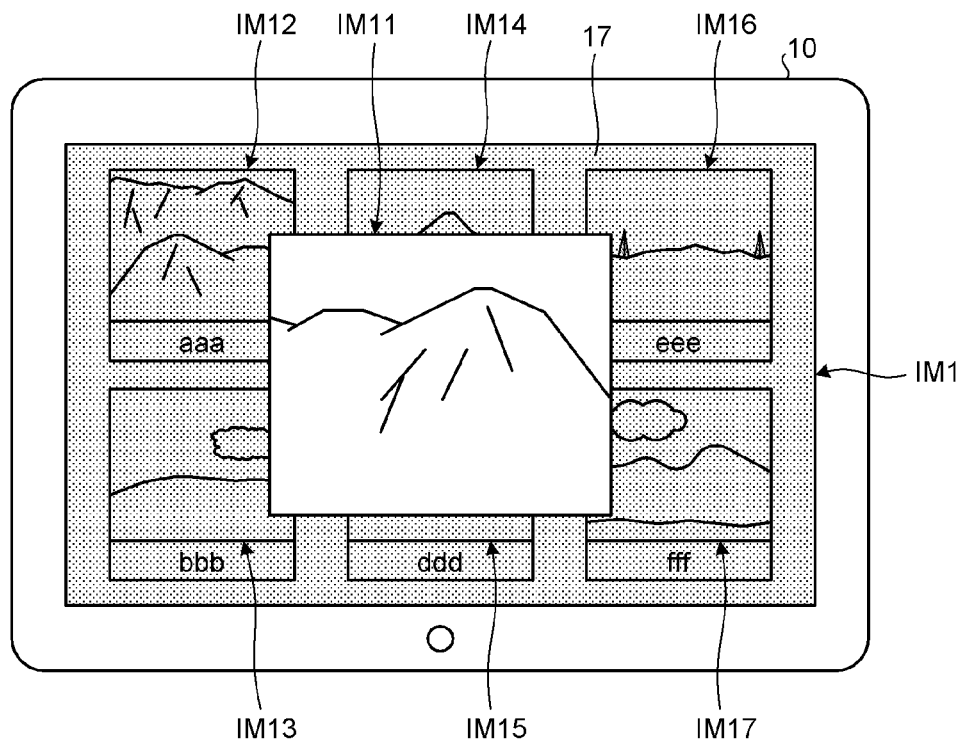
FIG. 4 is an exemplary diagram for explaining transition of a screen image displayed on a display module when the relevant information display program is executed by the tablet computer in the embodiment.

In the embodiment, for example, when a second image IM11 illustrated in FIG. 4 is acquired by the camera module 109, the CPU 101 controls the display module 17 to display an image IM1 comprising the second image IM11. The image IM1 illustrated in FIG. 4 comprises a plurality of (six) first images IM12 to IM17 that are the same as or similar to the second image IM11, and six pieces of relevant information (character strings of "aaa" to "fff") corresponding to the six first images IM12 to IM17, respectively. The six first images IM12 to IM17 are displayed as a background image of the second image IM11, and the six pieces of relevant information are displayed as text data.

In other words, in the embodiment, the CPU 101 performs the following control when the second image IM11 is acquired by the camera module 109, as illustrated in FIG. 4. That is, while controlling the display module 17 to display the second image IM11, the CPU 101 extracts the relevant information relevant to the first images IM12 to IM17 that are the same as or similar to the second image IM11 from the non-volatile memory 106, and controls the display module 17 to display the first images IM12 to IM17 together with the extracted relevant information.

In the embodiment, the CPU 101 can also control the display module 17 to display an image IM2 (see FIG. 5) obtained by deleting the second image IM11 from the image IM1 illustrated in FIG. 4. In other words, in the embodiment, the CPU 101 can control the display module 17 to display the image IM2 that contains only the first images IM12 to IM17 and the relevant information (character strings of "aaa" to "fff") corresponding to the first images IM12 to IM17, respectively, as illustrated in FIG. 5.

When the relevant information displayed on the display module 17 is address information on a web page to which the first image is uploaded, the address information such as a URL of the web page is displayed on the image IM1 in FIG.

Figure 5:
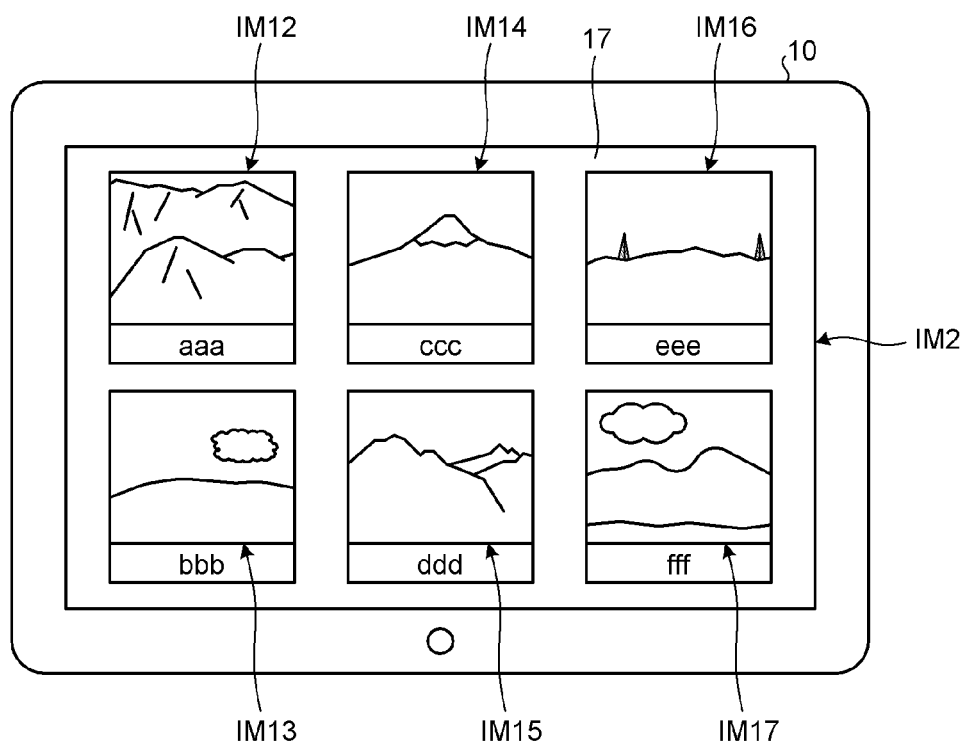
FIG. 5 is an exemplary diagram for explaining transition of a screen image displayed on the display module when the relevant information display program is executed by the tablet computer in the embodiment.

4 and the image IM2 in FIG. 5 instead of the character strings (character strings of "aaa" to "fff") as the relevant information. In this case, the user selects the address information displayed as the relevant information, so that the user can access the web page indicated by the address information. For example, when the user selects the address information, the display module 17 displays an image IM3 that contains a web page to which the first image IM12 was uploaded, a web page that contains descriptions of the first image IM12 or the like as illustrated in FIG. 6.

Figure 6:
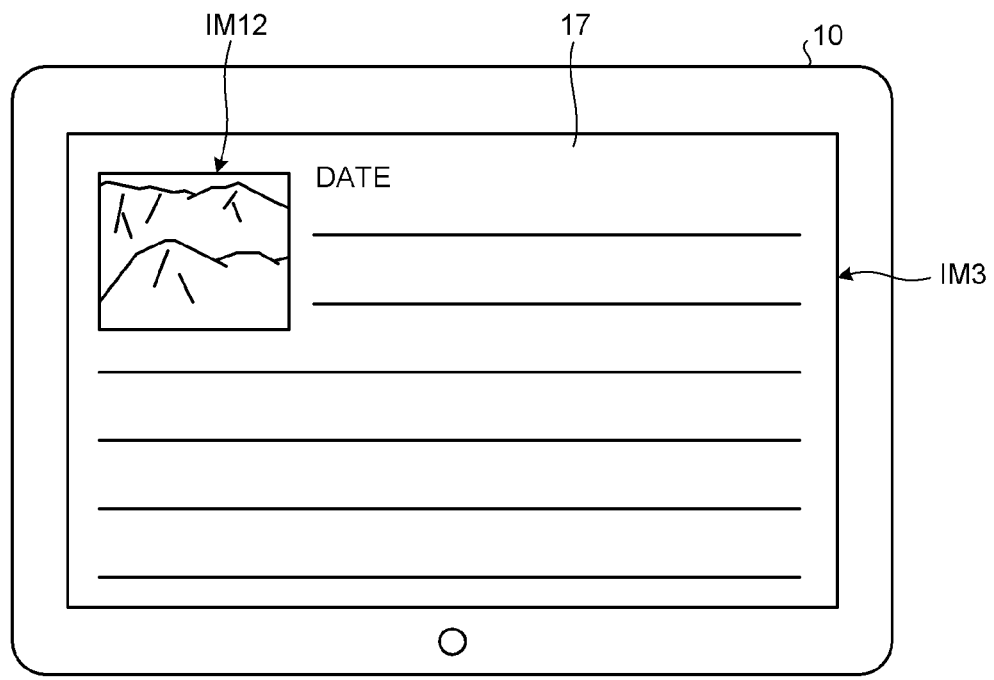
FIG. 6 is an exemplary diagram for explaining transition of a screen image displayed on the display module when the relevant information display program is executed by the tablet computer in the embodiment.

Although FIGS. 4 to 6 illustrate an example in which the second image IM11 and the first images IM12 to IM17 share a feature that they all contain an image of mountains, the embodiment is not limited to this. In the embodiment, the second image IM11 and the first images IM12 to IM17 may share a feature that they all contain an image of the same person. In this case, the tablet computer 10 extracts a first image containing a person's face from a plurality of images (first images) stored in the non-volatile memory 106 or external cloud servers, extracts facial features from the extracted first image, and then registers the extracted facial features as relevant information.

In the above configuration, when a second image that has been acquired by the user holding out the camera module 109 contains an image of a person, the tablet computer 10 extracts facial features of the person in the second image. The tablet computer 10 searches for matching between the facial features of the person in the second image and the facial features of the person in the first image registered as the relevant information above. The tablet computer 10 then determines whether the features of the first image and the features of the second image correspond to each other. In other words, the tablet computer 10 determines whether the person in the second image is the same as the person in the first image. The tablet computer 10 then groups a plurality of first images stored in the non-volatile memory 106 or the like on the basis of whether the first images contain the same person. The tablet computer 10 displays on the display module 17 a group of the first images that contain the same person as that in the second image, so that the first images can be seen at a glance.

When the relevant information is binary data such as music associated with the first images, file names indicating the binary data are displayed instead of the character strings (character strings of "aaa" to "fff") displayed on the image IM1 in FIG. 4 or the image IM2 in FIG. 5 as the relevant information. In this case, the user performs selection operation of a file name displayed as the relevant information, so that the user can watch or listen to the binary data (music, for example) corresponding to the file name.

Although FIGS. 4 and 5 illustrate an example in which the character strings "aaa" to "fff" are displayed as the relevant information, the tablet computer 10 in the embodiment may be configured to display a thumbnail image. That is, when the relevant information is a web page and a cache or the like of the web page is stored in the tablet computer 10, the tablet computer 10 may display, as the relevant information, a thumbnail image generated from the cache or the like.

Figure 3:
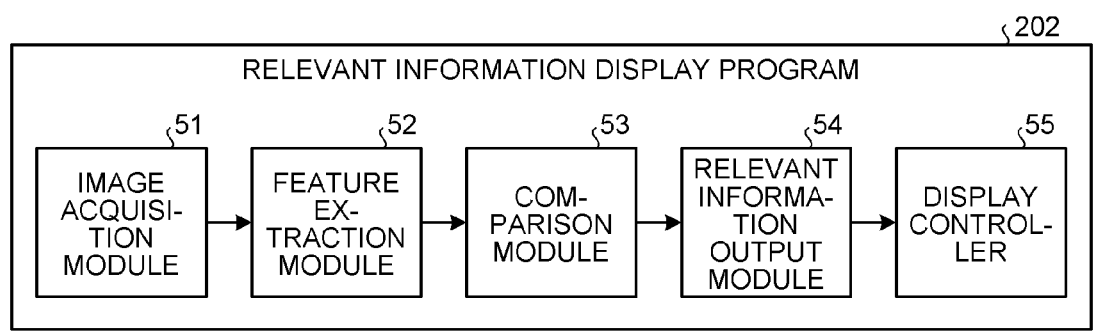
FIG. 3 is an exemplary block diagram illustrating a functional configuration of a relevant information display program executed by the tablet computer in the embodiment.

The CPU 101 performs the processing described above on the basis of the relevant information display program 202 (see FIG. 3) stored in the non-volatile memory 106. As illustrated in FIG. 3, the relevant information display program 202 mainly comprises an image acquisition module 51, a feature extraction module 52, a comparison module 53, a relevant information output module 54, and a display controller 55.

The image acquisition module 51 has a function to acquire an image (second image) of a subject when the user points the camera module 109 at the subject. The feature extraction module 52 has a function to extract a feature of the second image acquired by the image acquisition module 51. The feature extraction module 52 also extracts a feature of a first image (image that the camera module 109 actually captured before) that was registered in the non-volatile memory 106 as well as it extracts a feature of the second image. In order to extract features of the images, the feature extraction module 52 implements, for example, feature detection based on a region-based edge image recognition technique, feature detection based on feature values such as histograms of oriented gradient (HOG) or the like. Accordingly, the feature extraction module 52 can detect a feature of an image that does not contain special information such as a quick response (QR) code (registered trademark).

The comparison module 53 has a function to extract a first image with a feature that matches the feature of the second image at a matching rate equal to or larger than a predetermined value from the non-volatile memory 106 by comparing the feature of the second image acquired by the image acquisition module 51 to the features of all the first images registered in the non-volatile memory 106 one by one. The relevant information output module 54 has a function to read relevant information corresponding to the extracted first image (first image with a feature that matches the feature of the second image at a matching rate equal to or larger than a predetermined value) from the non-volatile memory 106, and to output the read relevant information. The display controller 55 has a function to control the graphics controller 104 to display the relevant information output by the relevant information output module 54 on the display module 17.

Figure 7:
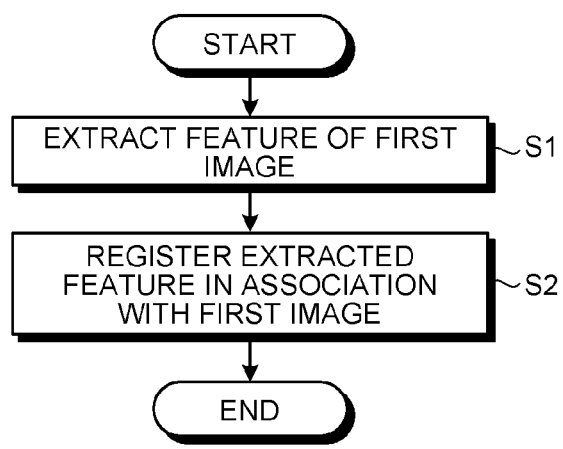
FIG. 7 is an exemplary flowchart of processing by a central processing unit (CPU) when an image is captured by a camera module of the tablet computer in the embodiment.

Next, with reference to FIG. 7, described is an example of processing flow performed by the CPU 101 when an image (first image) is acquired by the camera module 109 of the tablet computer 10 in the embodiment.

In this processing flow, as illustrated in FIG. 7, the CPU 101 extracts a feature of a first image acquired by the camera module 109 at S1, then the processing proceeds to S2.

At S2, the CPU 101 associates the feature extracted at S1 with the first image as relevant information, and registers (stores) the relevant information in the non-volatile memory 106. At S2, the CPU 101 may receive a manual input of relevant information from the user, associate the relevant information input by the user with the first image, and register the relevant information input by the user in the non-volatile memory 106. Thereby, the first image and the relevant information are registered in the non-volatile memory 106 in association with each other, and then, the process is terminated.

Figure 8:
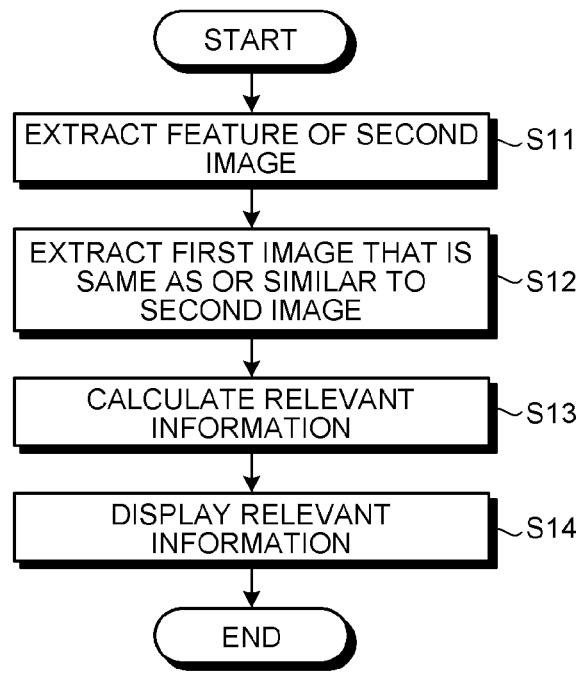
FIG. 8 is an exemplary flowchart of processing performed by the CPU when relevant information is displayed on the display module of the tablet computer in the embodiment.

Next, with reference to FIG. 8, described is an example of processing flow performed by the CPU 101 when the relevant information is displayed on the display module 17 of the tablet computer 10 in the embodiment. This processing flow starts when the user points the camera module 109 at a subject, and the camera module 109 acquires an image of the subject (second image).

In this processing flow, as illustrated in FIG. 8, the CPU 101 extracts, at S11, a feature of the second image acquired by the camera module 109, and the process proceeds to S12.

At S12, the CPU 101 extracts a first image that is the same as or similar to the second image from the non-volatile memory 106. Specifically, the CPU 101 compares, one by one, the feature of the second image extracted at S11 to the features of all the first images registered in the non-volatile memory 106 at S2 (see FIG. 7). The CPU 101 then extracts a first image with a feature that matches the feature of the second image at a matching rate equal to or larger than a predetermined value from the non-volatile memory 106.

The CPU 101 may be configured to return to the processing at S11 (processing of feature extraction on the second image) when, at S12, the CPU 101 finds no first image with a feature that matches the feature of the second image at a matching rate equal to or larger than a predetermined value. The CPU 101 may be configured to reduce, when the number of first images each having a feature that matches the feature of the second image at a matching rate equal to or larger than a predetermined value exceeds the number of images displayable on the display module 17, the number of first images by raising the threshold of the matching rate at S12.

After S12, the process proceeds to S13. At S13, the CPU 101 calculates the relevant information (first relevant information) relevant to the first image extracted at S12. In other words, at S13, the CPU 101 calculates the first relevant information by referring to the non-volatile memory 106 because the non-volatile memory 106 contains the first image and the first relevant information in association with each other. Then, the process proceeds to S14.

At S14, the CPU 101 controls the display module 17 to display the relevant information calculated at S13. Thereby, the display module 17 displays an image such as the image IM1 illustrated in FIG. 4 or the image IM2 illustrated in FIG. 5. Then, the process is terminated.

As described above, in the embodiment, the tablet computer 10 comprises the non-volatile memory 106 and the CPU 101. In the non-volatile memory 106, a first image and relevant information are stored in association with each other. The CPU 101 extracts from the non-volatile memory 106 relevant information and controls the display module 17 to display the extracted relevant information. The relevant information corresponds to a first image that is the same as or similar to the second image that is acquired by the camera module 109. In other words, in the embodiment, the CPU 101 is configured to register relevant information relevant to at least one image of a plurality of images stored in the non-volatile memory 106, and to control, when a first image of the images and a second image acquired by the camera module 109 correspond to each other, the display module 17 to display relevant information (first relevant information) relevant to the first image or information that can be acquired by the first relevant information. Thereby, the user can extract relevant information by referring to only an image group (group of first images stored in the non-volatile memory 106) that contains images registered by the user.

The tablet computer 10 (electronic device) according to the above embodiment has the hardware configuration that is implemented in a normal computer. The computer program (relevant information display program 202) executed by the CPU 101 of the tablet computer 10 is stored in the non-volatile memory 106 composed of a memory such as a read only memory (ROM) or a random access memory (RAM). The computer program is provided as an installable or executable file stored in a computer readable storage medium such as a CD-ROM, a flexible disc (FD), a CD-R, a digital versatile disk (DVD) or the like. In other words, the computer program is included in a computer program product having a non-transitory computer readable medium. The computer program may be stored in a computer connected to a network such as the Internet, and may be provided or distributed via the network. The computer program may be provided in a built-in memory such as the ROM.

The above embodiment describes an example in which six first images are displayed on the display module together with six pieces of relevant information, respectively. The display module, however, may display seven or more, or five or less first images and corresponding number of pieces of relevant information.

Figure 9:
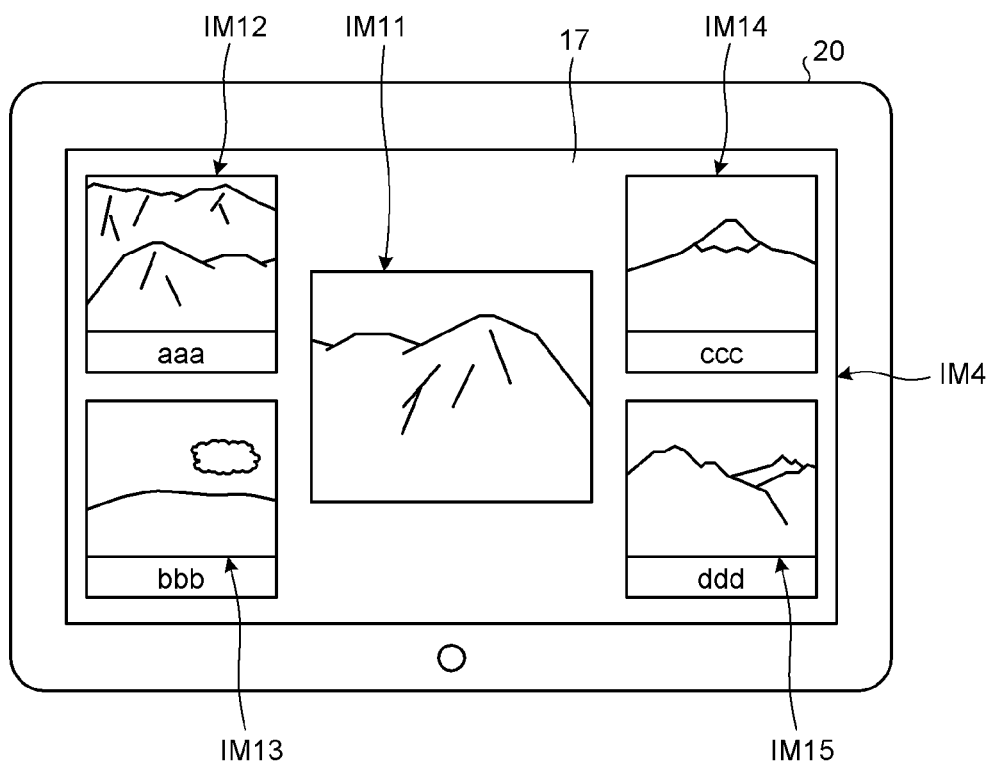
FIG. 9 is an exemplary diagram illustrating a state in which relevant information is displayed on the display module of a tablet computer according to a modification of the embodiment.

As a user interface (UI) on the display module that displays first images (and relevant information thereof), the above embodiment describes an example (see FIG. 4) in which the display module displays first images (and relevant information thereof) that are the same as or similar to a second image acquired by the camera module as the background image of the second image, or an example (see FIG. 5) in which the display module displays only the first images (and the relevant information thereof) without displaying the second image. However, in another embodiment, another UI with which the display module displays first images and a second image on the same screen image may be used. In other words, a tablet computer 20 illustrated in FIG. 9 may use a UI with which the display module 17 displays an image IM4 containing the second image IM11, the first images IM12 to IM15, and relevant information (character strings of "aaa" to "ddd") corresponding to the first images IM12 to IM15, respectively, such that all the images can be seen at a glance.

Although the above embodiment describes an example in which the display module displays features of a first image (such as the time and date when the first image was acquired, and the place where the first images was captured) and information of an address to which the first image is uploaded as relevant information, the display module can also display, as the relevant information, a map indicating the place where the first image was acquired, or an advertising website of a product contained in the first image.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of an electronic apparatus comprising:
    storing a first image comprising a first object, a first feature of the first object, a second image comprising a second object, and a second feature of the second object in a storage;
    displaying a motion picture captured by a camera on a screen of the electronic apparatus;
    extracting a third feature of a third object in the motion picture at a point of time;
    comparing the third feature with the first feature;
    comparing the third feature with the second feature;
    displaying the first image in addition to the motion picture on the screen, when the third feature matches the first feature and the third feature is unmatched with the second feature.

2. The method of claim 1, further comprising displaying both the first image and the second image in addition to the motion picture on the screen when the third feature matches the first feature and the third feature matches the second feature.

3. The method of claim 1, further comprising displaying first information related with the first image in addition to the motion picture and the first image on the screen.

4. The method of Claim 1, further comprising displaying both the first image and the second image in addition to the motion picture on the screen when a place of capturing the motion picture matches a place of capturing the second image.

5. The method of claim 1, further comprising displaying both the first image and the second image in addition to the motion picture on the screen, when a place of capturing the motion picture matches a place of capturing the first image.

6. An electronic device comprising:
   a memory configured to store a first image comprising a first object, a first feature of the first object, a second image comprising a second object, and a second feature of the second object;
   a camera configured to capture a motion picture;
   a screen capable of displaying the motion picture captured by camera on the screen;
   a hardware processor configured to:
   extract a third feature of a third object in the motion picture at a point of time;
   compare the third feature with the first feature;
   compare the third feature with the second feature; and
   display the first image in addition to the motion picture on the screen, when the third feature matches the first feature and the third feature is unmatched with the second feature.

7. The electronic device of claim 6, wherein the hardware processor is further configured to display both the first image and the second image in addition to the motion picture on the screen, when the third feature matches the first feature and the third feature matches the second feature.

8. The electronic device of claim 6, wherein the hardware processor is further configured to display first information related with the first image in addition to the motion picture and the first image on the screen.

9. The electronic device of claim 6, wherein the hardware processor is further configured to display both the first image and the second image in addition to the motion picture on the screen, when a place of capturing the motion picture matches a place of capturing the second image.

10. The electronic device of claim 6, wherein the hardware processor comprises means for displaying the first image in addition to the motion picture on the screen, when the third feature matches the first feature and the third feature is unmatched with the second feature.

11. A computer program product having a non-transitory computer readable medium including programmed instructions, wherein the instructions, when executed by a computer, cause the computer to perform:
   storing a first image comprising a first object, a first feature of the first object, a second image comprising a second object, and a second feature of the second object;
   displaying a motion picture being captured by a camera on a screen of the computer;
   extracting a third feature of a third object in the motion picture at a point of time
   comparing the third feature with the first feature;
   comparing the third feature with the second feature;
   displaying the first image in addition to the motion picture on the screen, when the third feature matches the first feature and the third feature is unmatched with the second feature.

12. The computer program product of claim 11, wherein the instructions further cause the computer to perform displaying both the first image and the second image in addition to the motion picture on the screen, when the third feature matches the first feature and the third feature matches the second feature.

13. The computer program product of claim 11, wherein the instructions further cause the computer to perform displaying first information related with the first image in addition to the motion picture and the first image on the screen.

14. The computer program product of claim 11, wherein the instructions further cause the computer to perform displaying both the first image and the second image in addition to the motion picture on the screen, when a place of capturing the motion picture matches a place of capturing the second image.

15. The computer program product of claim 11, wherein the first feature is registered in association with the first image after the first image is acquired by the camera and stored in the storage.

\* \* \* \* \*